(12) United States Patent
Bock et al.

(10) Patent No.: US 10,419,120 B2
(45) Date of Patent: Sep. 17, 2019

(54) PHASED-ARRAY COHERENT TRANSCEIVER

(71) Applicant: LOCKHEED MARTIN CORPORATION, Bethesda, MD (US)

(72) Inventors: Kevin Richard Bock, San Jose, CA (US); Patrick Eliott Perkins, Woodside, CA (US); Christopher William Tischhauser, Campbell, CA (US); Danielle Marie Rawles Wuchenich, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/217,833

(22) Filed: Jul. 22, 2016

(65) Prior Publication Data

US 2018/0026721 A1    Jan. 25, 2018

(51) Int. Cl.
| | |
|---|---|
| *H04B 10/40* | (2013.01) |
| *H04B 10/548* | (2013.01) |
| *H04B 10/11* | (2013.01) |
| *H04B 10/64* | (2013.01) |
| *H04B 10/112* | (2013.01) |

(52) U.S. Cl.
CPC ............ *H04B 10/40* (2013.01); *H04B 10/11* (2013.01); *H04B 10/1123* (2013.01); *H04B 10/548* (2013.01); *H04B 10/64* (2013.01)

(58) Field of Classification Search
CPC ................. G02B 2006/12142; H04J 14/02
See application file for complete search history.

(56) References Cited

U.S. PATENT DOCUMENTS

| | | | | |
|---|---|---|---|---|
| 5,896,216 | A * | 4/1999 | Kikushima | .............. H04N 7/22 |
| | | | | 348/E7.094 |
| 7,826,752 | B1 * | 11/2010 | Zanoni | ............... H04B 10/5055 |
| | | | | 398/186 |
| 2009/0060511 | A1 * | 3/2009 | Toyoshima | ............ H04B 10/61 |
| | | | | 398/74 |
| 2009/0185811 | A1 * | 7/2009 | Cho | ........................ H04B 10/61 |
| | | | | 398/214 |
| 2009/0220246 | A1 * | 9/2009 | Khurgin | ............ H04B 10/1121 |
| | | | | 398/141 |
| 2010/0021166 | A1 * | 1/2010 | Way | ........................ H04J 14/02 |
| | | | | 398/79 |
| 2010/0098438 | A1 * | 4/2010 | Prat Goma | ............ H04B 10/61 |
| | | | | 398/203 |

(Continued)

OTHER PUBLICATIONS

Hans Bruesselbach ,"Power-scalable phase-compensating fiber-array transceiver for laser communications through the atmosphere"—vol. 22, No. 2/Feb. 2005/J. Opt. Soc. Am. B, pp. 1-6.*

*Primary Examiner* — Omar S Ismail
(74) *Attorney, Agent, or Firm* — Morgan, Lewis & Bockius LLP

(57) ABSTRACT

A phased-array coherent transceiver system includes a transceiver array including multiple receive (RX) optical elements, a number of RX optical fibers, and an optical receiver. The RX optical elements are coupled to the optical receiver via the RX optical fibers. The optical receiver includes multiple phase modulators, each phase modulator processes a phase of an optical signal received from an RX optical element.

20 Claims, 7 Drawing Sheets

(56) References Cited

U.S. PATENT DOCUMENTS

| | | | | |
|---|---|---|---|---|
| 2011/0013911 A1* | 1/2011 | Alexander | ............ | H04B 10/29 398/79 |
| 2012/0326039 A1* | 12/2012 | Demers | ................ | G01J 3/10 250/338.4 |
| 2014/0376001 A1* | 12/2014 | Swanson | .............. | A61B 5/0066 356/479 |
| 2015/0148655 A1* | 5/2015 | Haupt | ................. | A61B 8/0808 600/407 |
| 2016/0204866 A1* | 7/2016 | Boroson | ............ | H04B 10/1121 398/97 |

* cited by examiner

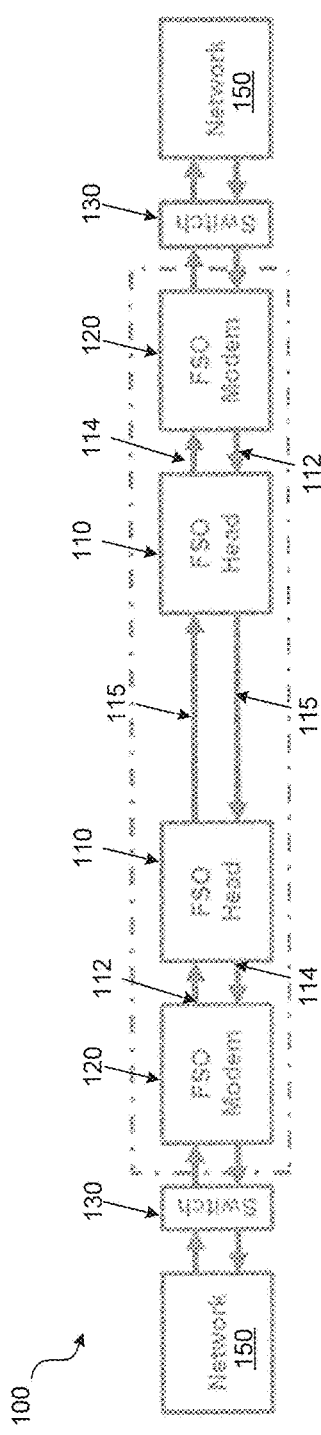
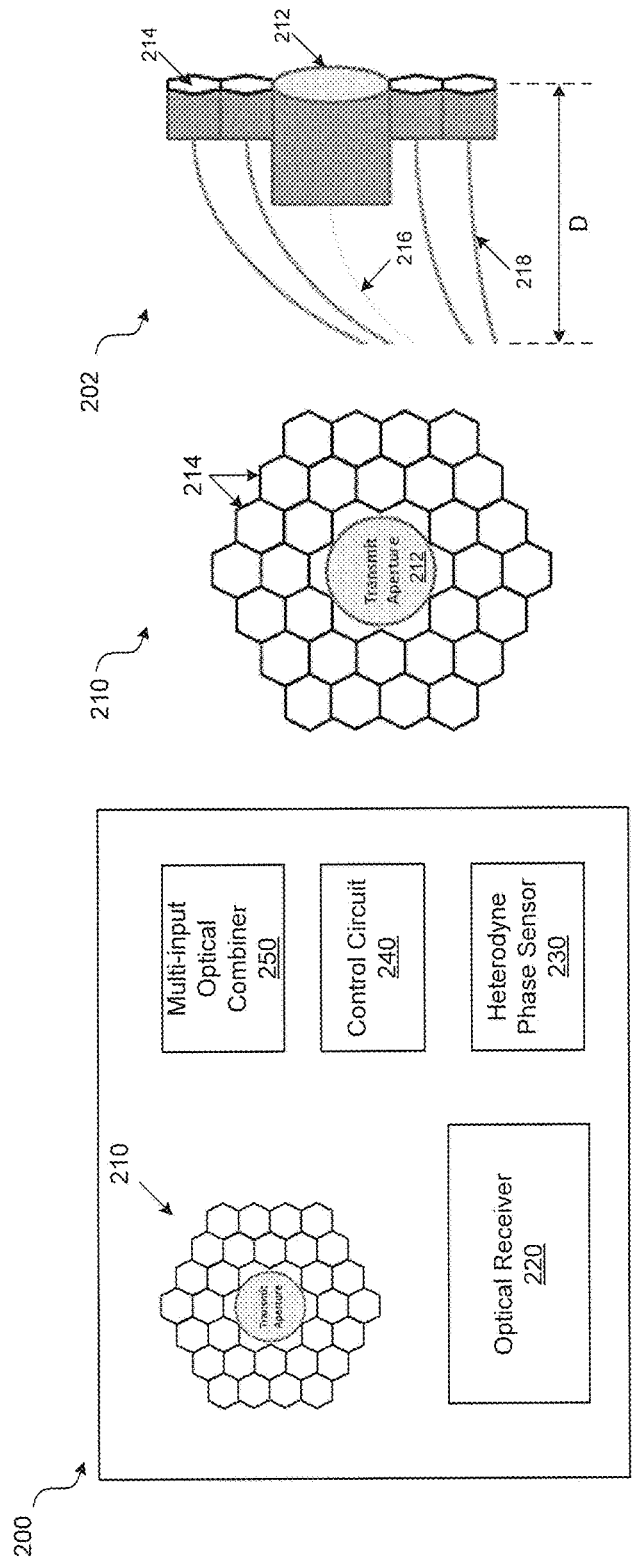

PHASED-ARRAY COHERENT TRANSCEIVER

STATEMENT REGARDING FEDERALLY SPONSORED RESEARCH OR DEVELOPMENT

Not applicable

FIELD OF THE INVENTION

The present invention generally relates to coherent free space optical (FSO) communications, and more particularly, to a phased-array coherent transceiver for high speed FSO communications.

BACKGROUND

Many optical transceivers operate based on coherent communications, in which the receiver has a prior knowledge of the type of the data being transmitted. For example, in heterodyne systems, the receiver may have information on a carrier frequency and a phase of the carrier frequency of a received modulated signal and can apply a corresponding local oscillator (LO) with proper frequency and phase to demodulate the received signal. Coherent communications provides orders of magnitude better receiver sensitivities over non-coherent detection (e.g., direct detection). For example, a coherent receiver may have a better sensitivity of about 20 to 40 photons/bit as compared to a typical receiver sensitivity of a non-coherent receiver of more than 1000 photons/bit. Additionally, LO gain enables use of noisier, but faster receivers (e.g., optical detectors) and enables much higher data rates (e.g., 40 to 100 Gbps) which is significantly higher than data rates (e.g., 10 Gbps) of non-coherent receivers.

Free space optical (FSO) communications can enable high-speed wireless communications over a sizable range (e.g., many kilometers). In terrestrial applications, atmospheric turbulence can significantly degrade performance. For example, the atmospheric turbulence can substantially reduce coherence of received (RX) light causing coherent systems to underperform direct detect systems.

An adaptive optics technique has been used to address the problem of recovering the spatial coherence of the received light disturbed by the atmospheric turbulences. This technique involves measuring the spatial phase variations of the incoming received light and using some sort of corrector (e.g., a deformable mirror) to flatten the phase of the received signal. This technique reduces the phase differences between the signal and the local oscillator and can improve the coherent SNR of the system. The adaptive optics systems, however, have to use expensive low-noise sensors and unreliable micro-mechanical mirrors as deformable mirrors. Further, the adaptive optics systems introduce additional optical losses into the system that adversely affect the optical throughput efficiency of the system.

SUMMARY

In some aspects, A phased-array coherent transceiver system includes a transceiver array including multiple receive (RX) optical elements, a number of RX optical fibers, and an optical receiver. The RX optical elements are coupled to the optical receiver via the RX optical fibers. The optical receiver includes multiple phase modulators, each phase modulator processes a phase of an optical signal received from of an RX optical element.

In other aspects, a method of providing a phased-array coherent transceiver includes providing a transceiver array including multiple receive (RX) optical elements and coupling the RX optical elements via a number of RX optical fibers to an optical receiver including multiple phase modulators. The method further includes configuring each phase modulator to process a phase of an optical signal received from an RX optical element and coupling a first portion of an output light signal of the phase modulator to a multi-input optical combiner. The multi-input optical combiner coherently combines first portions of output light signals of the phase modulators.

In yet other aspects, a free-space optical (FSO) communication system includes at least two FSO transceivers. One FSO transceiver is coupled via an FSO modem to a network. The FSO transceiver includes a transceiver array that includes multiple receive (RX) optical elements and an optical receiver coupled to the RX optical elements via a number of RX optical fibers. The optical receiver includes a photonic integrated circuit including multiple phase modulators coupled to a number of balanced detectors. Each phase modulator processes a phase of an optical signal received from of an RX optical element.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIG. 1 is a block diagram illustrating an example of a free-space optical (FSO) communication system.

FIGS. 2A through 2E are diagrams illustrating examples of a phased-array coherent transceiver and corresponding components, according to certain aspects.

DETAILED DESCRIPTION

Figure 2D:
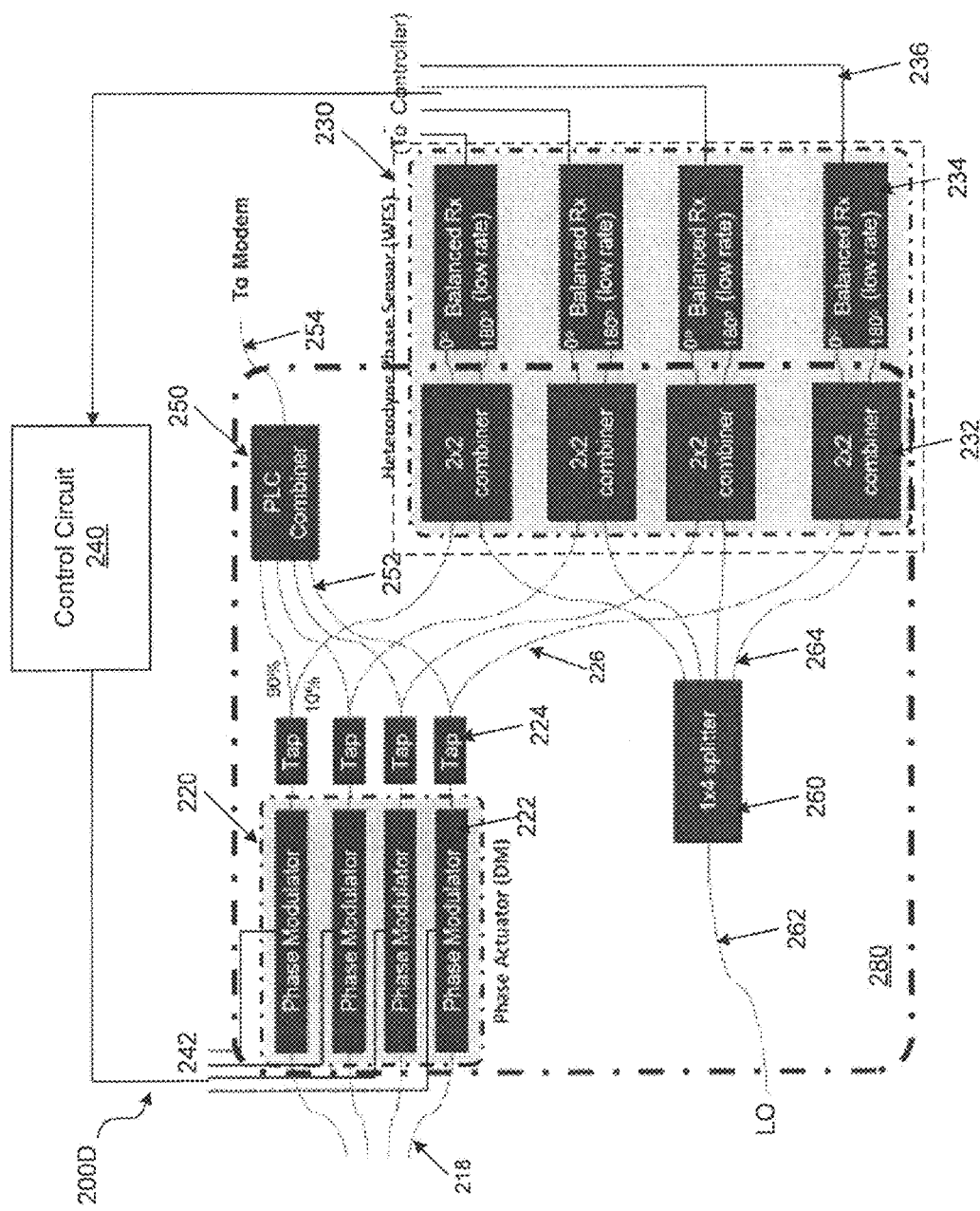

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to methods and configuration for providing a phased-array coherent transceiver for high speed FSO communications. The disclosed phased array solution can break up a traditional aperture into many sub-apertures over which the atmospheric disturbances are negligible. Each of the sub-apertures consists of a telescope (e.g., a lens) that focuses light onto a single-mode fiber. Each of single-mode fibers is well phased in order to combine the light and improve the signal-to-noise ratio (SNR) of the receiver. Enabling coherent communications over free space optical links has traditionally been done using adaptive optics. Adaptive optics is the field of measuring an aberrated received wavefront, typically aberrated by atmospheric turbulence, and then driving a deformable mirror to compensate for the phase disturbance of the aberrated received wavefront. This solution may correct most of the phase errors in the received light, and improve the coupling efficiency into a single-mode fiber. The adaptive optics solution has been applied to both received light as well as transmitted light.

The proposed solution has significant advantages over the adaptive optics solution. For example, the phased-array coherent transceiver of the subject technology is entirely solid state and unlike the adaptive optics solution, does not need mechanical actuators to perform the phase correction. Therefore, the disclosed solution can run at a significantly higher bandwidth and is substantially more robust. The phased-array coherent transceiver of the subject technology is substantially smaller and lighter and offers three substantial space, weight, and power (SWAP) saving features over the traditional approach. First, for a fixed collection area, the phased array has a fraction of a depth of the traditional adaptive optics system resulting in a substantial volume and weight savings. Second, the adaptive optics solution requires free-space correction and beam routing, implying a large optical bench attached to the telescope, whereas the disclosed solution can be placed anywhere as it is connected to the collector array by a bundle of low-loss single-mode fiber. This results in a significant mass savings that a gimbal may need to handle. Third, the entire disclosed beam combiner can be put into a photonic integrated circuit (PIC), such that the entire beam combiner that is no more than a few inches a side. The alignment of the phased array is the only alignment to be done for the disclosed approach, which is significantly easier and can be done reliably and repeatedly without spending extensive expert man-hours.

FIG. 1 is a block diagram illustrating an example of a free-space optical (FSO) communication system 100 of the subject technology. The FSO system 100 includes FSP transceivers (e.g., heads) 110 optically communicating with one another through open space. Each FSO transceiver 110 is coupled to an FSO modem 120, which in turn is in communication with a network 150 via a network switch 130. Examples of the network 150 include the Internet, a local area network (LAN), an Ethernet network, or other networks). In one or more aspects, the FSO transceiver 110 receives optical signals 112 from the FSO modem 120 and transmits electrical signals 114 to the FSO modem 120. Communications between the FSO modem 120 and the switch 130 and between the switch 130 and the network 150 is through electrical signals. The subject technology provides the FSO transceiver 110 that is capable of correcting the phase of the LO signal to match with the phase of the received optical signal 115 to compensate for the atmospheric disturbance.

FIGS. 2A through 2E are diagrams illustrating examples of a phased-array coherent transceiver 200 and corresponding components, according to certain aspects of the subject technology. In some aspects, the phased-array coherent transceiver 200 includes a transceiver array 210, an optical receiver 220, a heterodyne phase sensor 230, a control circuit 240, and a multi-input optical combiner 250. The transceiver array 210, as shown in a top-view and a side-view 202 shown in FIGS. 2B and 2C includes multiple receive (RX) optical elements (e.g., sub-apertures) 214 and one or more transmit (TX) optical elements 212. The RX optical elements 214 and the TX optical elements 214 are coupled via a number of RX optical fibers 218 and one or more TX optical fibers 216 to a phase modulator. In one or more aspects, the RX and TX optical fibers are single mode optical fibers and the transceiver array 210 is a compact assembly, for example, with a depth, D, of less than 5 cm, as compared to the aperture of an existing adaptive optics solution that may have a depth of about 30-40 cm. The arrangement of the RX optical elements 214 and the TX optical elements 212 in the transceiver array 210 may be different from that shown in FIG. 2C as further described below.

The optical receiver 220 and the heterodyne phase sensor 230 are shown in the block diagram 200D of FIG. 2D. The optical receiver 220 includes multiple phase modulators 222 which are coupled via RX optical fibers 218 to the RX optical element 214 of the transceiver array 210. Each phase modulator 222 processes a phase of an optical signal received from of one of the RX optical elements 214. In some aspects, the phase modulators 222 are electro-optical (EO) crystal modulators such as lithium niobate crystal modulators. Each phase modulator 222 receives a control signal (e.g., phase command signal) 242 from the control circuit 240 and processes (e.g., modulates) a phase of a respective input optical signal received from a respective optical RX element 214 based on the control signal 242.

The phase-modulated optical signal from each phase modulator 222 is divided by a splitter tap 224 into a first portion 252 and a second portion 226. The first portions 252 (e.g., about 90%) of the phase-modulated optical signals of the phase modulators 222 are coherently combined via a multi-input combiner, such as a planar light wave circuit (PLC) combiner 250 and delivered to a modem (e.g., the FSO modem 120 of FIG. 1). The second portion 226 (e.g., about 10%) of the phase-modulated optical signal of each phase modulators 222 is fed into an optical combiner (e.g., a 2×2 combiner) 232 for being coherently combined with a portion 264 of a local oscillator (LO) signal 262. The LO signal 262 is an optical LO signal generated by an optical LO source such as a laser (not shown herein for simplicity) and is split by a splitter (e.g., a 1×4 splitter) 260 into a number of (e.g., four) optical LO signals 264.

In one or more aspects, the optical receiver 220, the splitter taps 224, the optical combiners 232, the PLC combiners 250, and the splitter 260 can be integrated into a photonic integrated circuit (IC) 280. The photonic IC 280 is optically coupled to the balanced receivers (also referred to as balanced detectors) 234 of the heterodyne phase sensor 230. Each optical combiner 232 generates two out-of-phase optical signals with 180 degrees phase difference. For example, one of the out-of-phase optical signals has a phase of zero degrees and the other one has a phase of 180 degrees. The two out-of-phase optical signals from each optical combiner 232 are fed into one of the balanced detectors 234 of the heterodyne phase sensor 230. The output of each balance detector 234 is an output signal 236 that is a heterodyne electrical signal and is fed in the control circuit 240.

The processing of the phase of a respective input optical signal by each modulator 222 results in correcting the phase of the respective input optical signal to remove adverse effects of an atmospheric turbulence on the optical signal. The atmospheric turbulence disturbs, for example, the phase of the optical signal (e.g., 115 of FIG. 1) while traveling in open space.

Figure 2E:
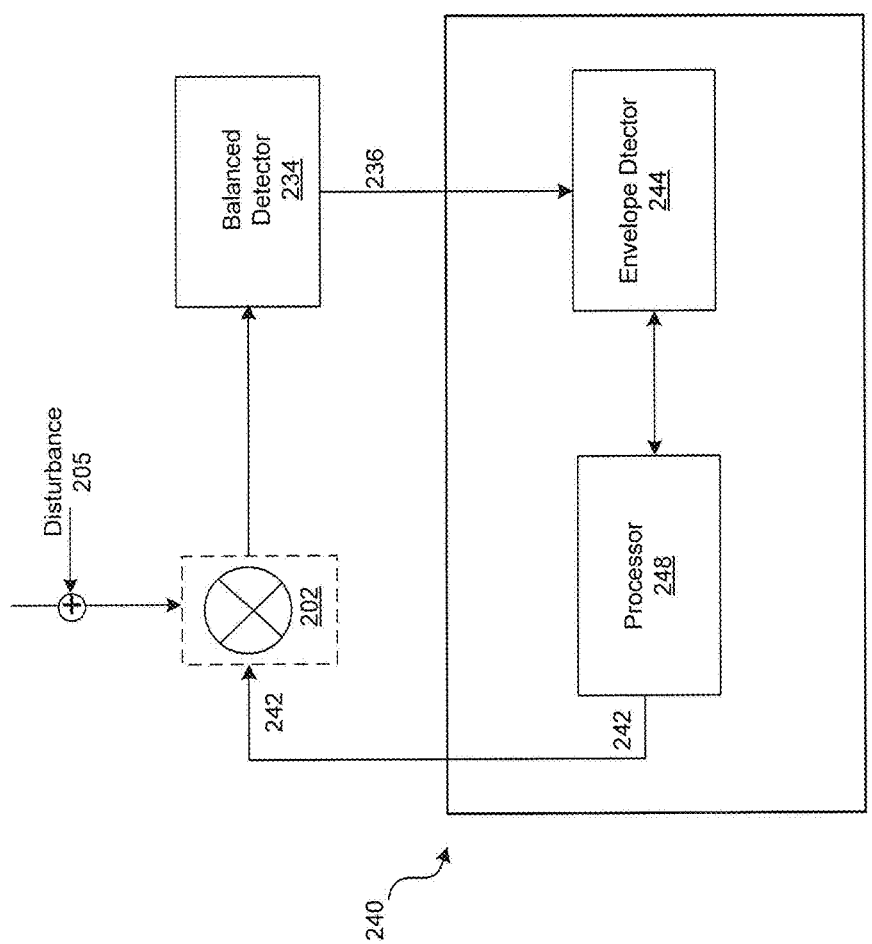

The control circuit 240 receives the output signal 236 and generates control signals 242 that are used by the phase modulators 222 to process (e.g., modulate) the phase of the respective input optical signal received from the optical element 214 of FIG. 2B based on the control signal 242. An example structure of the control circuit 240 is shown in FIG. 2E. In one or more aspects, the control circuit 240 includes a power measurement circuit (e.g., envelope detector) 244 and a processor 248. It is understood that the output signal 236 is an electrical current signal with a tone at the frequency f and an amplitude proportional to $\cos(\phi_{atmosphere} + \phi_{correction})$, where $\phi_{atmosphere}$ and $\phi_{correction}$ are the phases attributed to the atmospheric disturbance 205 and a correction made by the phase modulator 202. The envelope detector 244 can determine a power of the output signal 236. In one or more aspects, the control circuit 240 uses the processor 248 to estimate a desired phase of a dephased optical signal as an initial phase correction value (e.g. of $\phi_{correction}$) and to increment the initial phase correction value in an optimization loop to maximize the power of the output signal 236, as determined by the envelope detector 244. In some aspects, the processor 248 may coordinate the functionalities of the control circuit 240, for example, by controlling the timings of the control signal 242. Examples of the processor 248 include a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or any other suitable device that can perform calculations or other manipulations of information.

Figure 3B:
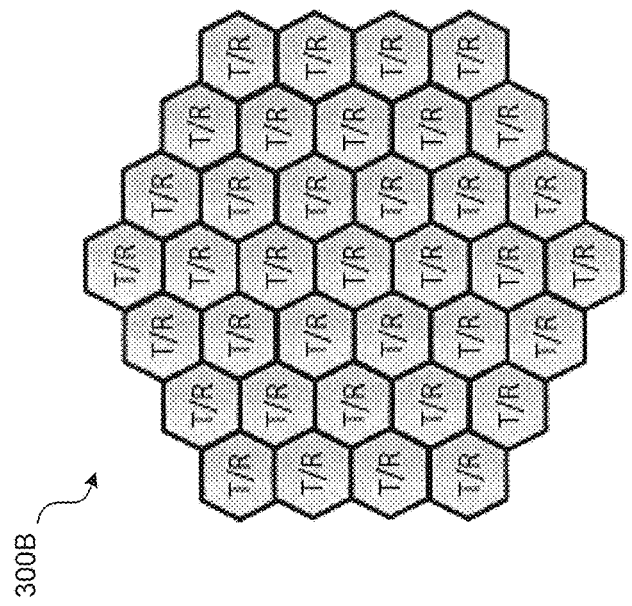
FIGS. 3A-3B are diagrams illustrating examples of an array of optical elements of a coherent transceiver, according to certain aspects.
Figure 3A:
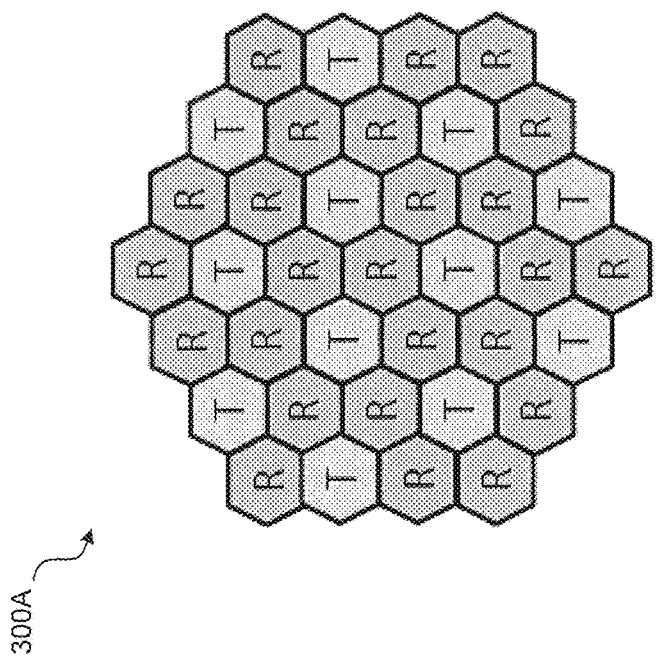

FIGS. 3A-3B are diagrams illustrating examples of an array of optical elements of a coherent transceiver, according to certain aspects of the subject technology. An array configuration 300A, shown in FIG. 3A, is a locally bi-static solution for phase control, where receiver (RX) and transmitter (TX) sub-apertures (denoted in FIG. 3A as R and T, respectively) are alternated and none of the sub-apertures are shared. In the array configuration 300A, the sub-apertures (e.g., R and T) must be small enough that interpolating the measured phased from the received sub-apertures gives a good enough (e.g., better than $1/10^{th}$ of a wavelength) approximation to the phase over the TX sub-aperture. This has advantages as in the bi-static solutions, secondary reflections from optics that can blind the receiver sensors, due to the transmit power being orders of magnitude higher than the received power, is of no concern.

In a locally mono-static solution for phase control, as shown in an array configuration 300B shown in FIG. 3B, the receiver (R) and transmitter (T) sub-apertures are shared. The array configuration 300B has advantages in the phase sensing and control area as the receiver senses the exact phase it needs to apply to the transmitter. However, this solution can add complexity as a sufficient rejection of the back-reflected transmitted light has to be provided so that the back-reflected transmitted light doesn't corrupt/blind the receiver sensor. This can be done by using polarization diversity, for example, by transmitting in one polarization and receiving in another, or by transmitting and receiving at different wavelengths and using narrowband filters to reject back reflections. In the locally mono-static solution the entire area of the array can be used for transmission, as opposed to the bi-static solution that allows transmission from a limited portion of the entire aperture of the array (e.g., T sub-apertures).

Figure 4A:
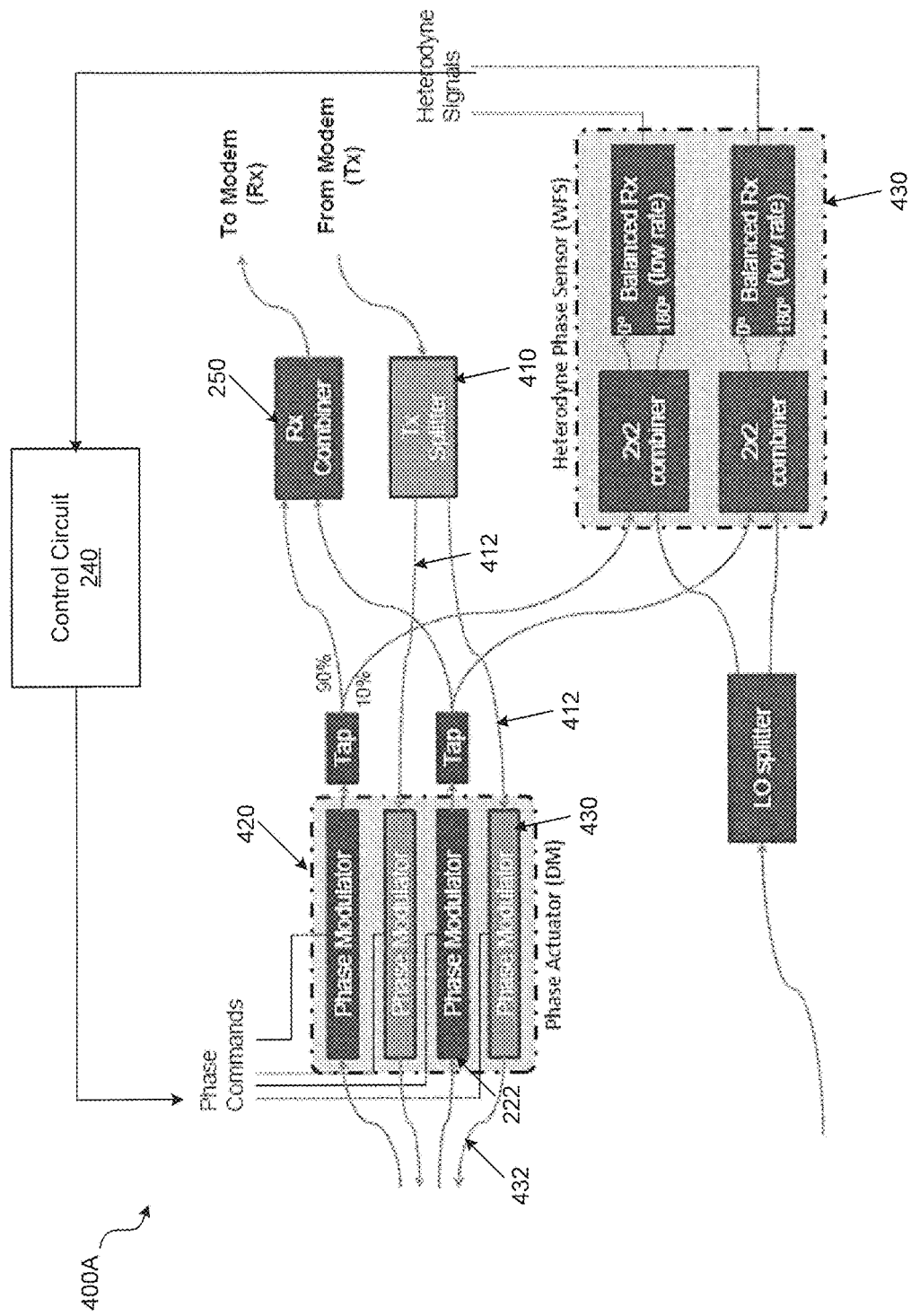
FIGS. 4A-4B are diagrams illustrating examples of a coherent optical transceiver, according to certain aspects.
Figure 4B:
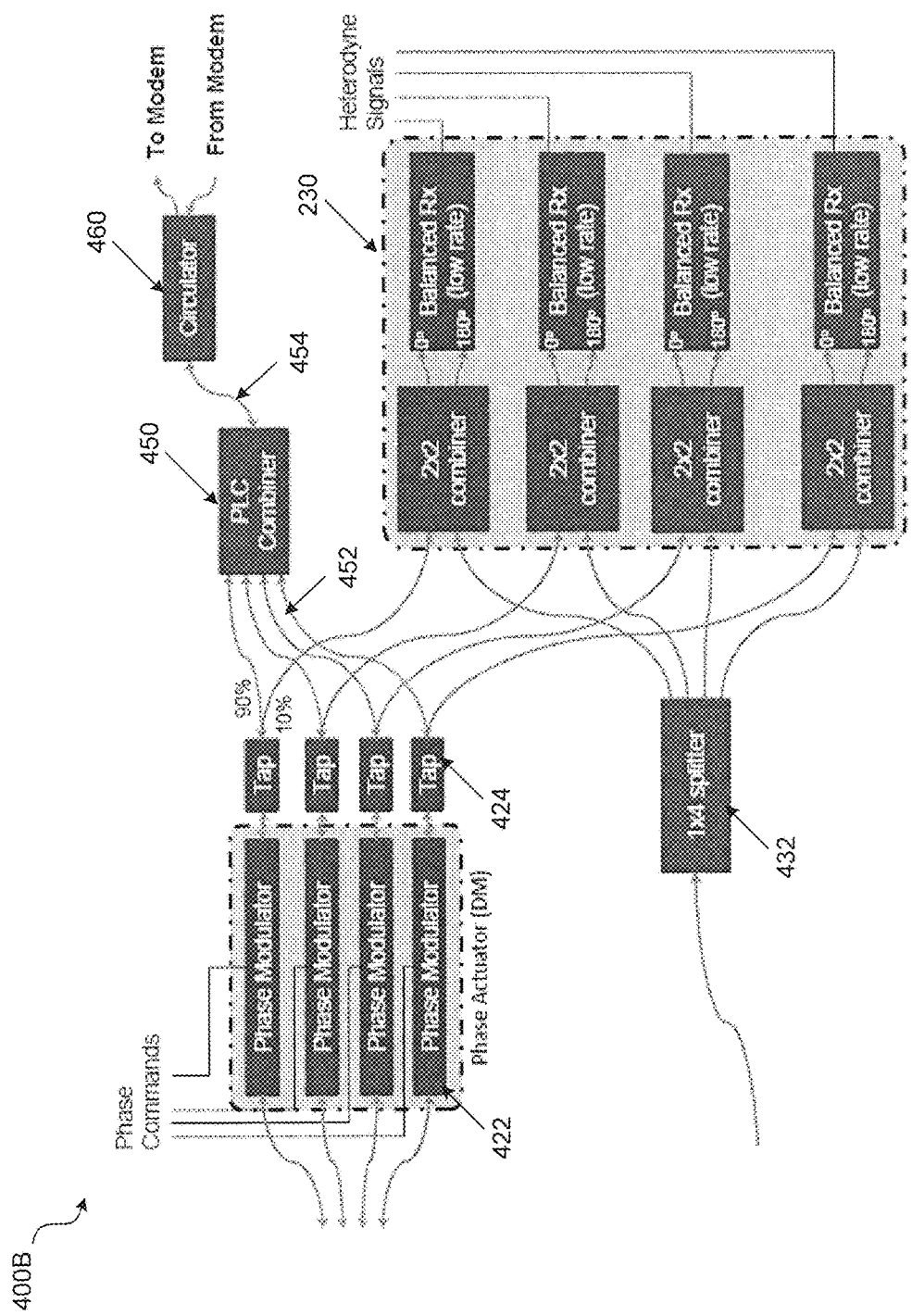

FIG. 4A-4B are diagrams illustrating examples of a coherent optical transceiver 400A, according to certain aspects of the subject technology. The coherent optical transceiver 400A is similar to the coherent optical receiver 200D of FIG. 2D, except that two channels of the phase modulator 420 are used as TX phase modulators 430 and two other channels are used as RX phase modulators 222, and the heterodyne phase sensor 430 includes only two channels. In one or more aspects, each TX phase modulator 430 can receive a TX optical signal 412 from a TX splitter 410 that is coupled to a TX modem and splits the signal received from the TX modem (e.g. 120 of FIG. 1) into a number of (e.g., 2) similar TX optical signals 412. In some aspects, a TX phase modulator 430 receives a pre-compensated TX optical signal from the TX splitter 410. The pre-compensated TX optical signal is preprocessed to counter an adverse effect of an atmospheric turbulence on the pre-compensated TX optical signal. In some aspects, the pre-compensation is performed by the TX phase modulator 430 based on the phase command received from the control circuit 240. The pre-compensation allows for increased link performance by increasing irradiance on receiver aperture. It is understood that the locally mono-static approach (e.g., with array configuration 300B of FIG. 3B) has a better performance than the bi-static approach (e.g., with array configuration 300A of FIG. 3A), when pre-compensation is used. The advantage is at the expense of resources for managing the backscatter (e.g., secondary reflections from the optics). The multi-input optical combiner 250 is shown as a two-input optical combiner that combines the main portion (e.g., 90%) of the light output of the RX phase modulators 222 for being fed to an RX modem (e.g., 120 of FIG. 1).

The coherent optical transceiver 400B is similar to the coherent optical receiver 200D of FIG. 2D, except that, for example, each phase modulator 422 is both a RX and TX phase modulator, a PLC combiner 450 is a combiner/splitter, and the coherent optical transceiver 400B further includes a circulator 460. The circulator 460 facilitates for the PLC combiner 450 to both receive optical signals from a modem through optical fiber 454 and transmit optical signals to a modem through the same optical fiber 454. Taps 424 perform an additional function of passing the entire optical signal received from the optical fibers 452 to the phase modulator 422 while splitting the optical signal received from the phase modulator 422 into two branches for transmission to the PLC combiner 450 and the heterodyne phase sensor 230. The functionalities of the heterodyne phase sensor 230 was described above and the heterodyne signals from the heterodyne phase sensor 230 are used by the controller 240 of FIG. 2D to generate control signals 242, as explained above with respect to FIG. 2E.

Figure 5:
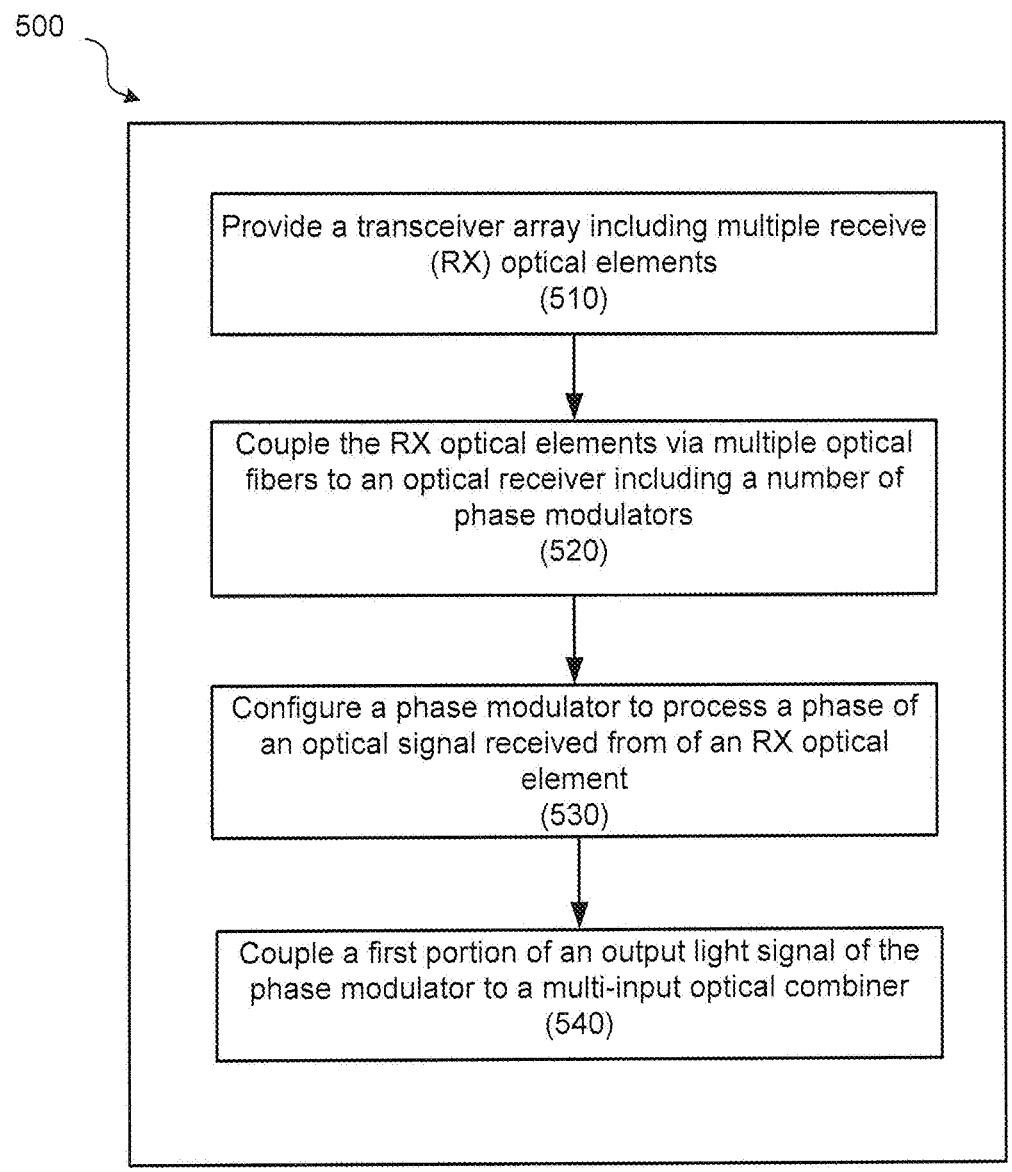
FIG. 5 is a flow diagram illustrating an example of a method for providing a phased-array coherent transceiver, according to certain aspects.

FIG. 5 is a flow diagram illustrating an example of a method 500 for providing a phased-array coherent transceiver (e.g., 200 of FIG. 2A, 400A of FIG. 4A, or 400B of FIG. 4B), according to certain aspects of the subject technology. The method 500 includes providing a transceiver array (e.g., 210 of FIG. 2B, 300A of FIG. 3A, or 300B of FIG. 3B) including multiple receive (RX) optical elements (e.g., 214 of FIG. 2B) (510). Coupling the RX optical elements via a number of RX optical fibers (e.g., 218 of FIG. 2C) to an optical receiver (e.g., 200D of FIG. 2D) including multiple phase modulators (e.g., 222 of FIG. 2D) (520). The method further includes configuring each phase modulator to process a phase of an optical signal received from of an RX optical element (530). A first portion of an output light signal (e.g., 90%, as seen in FIG. 2D) of the phase modulator is coupled to a multi-input optical combiner (e.g., 250 of FIG. 2D) (540). The multi-input optical combiner coherently combines first portions of output light signals of the phase modulators.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A phased-array coherent transceiver system, the system comprising:
    a transceiver array comprising a plurality of receive (RX) optical elements;
    a plurality of RX optical fibers; and
    an optical receiver comprising a photonic integrated circuit coupled to a plurality of balanced detectors,
    wherein:
    the plurality of RX optical elements are coupled to the optical receiver via the plurality of RX optical fibers,
    the optical receiver comprises a plurality of phase modulators, and
    a phase modulator of the plurality of phase modulators is configured to correct a phase of an optical signal to produce a corrected phase by using a phase command signal generated based on a heterodyne electrical current signal including phase information related to the corrected phase and an atmospheric disturbance.

2. The system of claim 1, further comprising a multi-input optical combiner, wherein the multi-input optical combiner is configured to coherently combine a first portion of an output light signal of the phase modulator.

3. The system of claim 1, further comprising a control circuit configured to receive the heterodyne electrical output signal of the respective one of the plurality of balanced detectors and to generate the phase command signal.

4. The system of claim 3, further comprising a plurality of two-input combiners, a two-input combiner of the plurality of two-input combiners is configured to receive a second portion of an output light signal of a respective phase modulator and a local oscillator (LO) signal and to generate two out-of-phase optical signals, wherein the two out-of-phase optical signals have 180 degrees phase difference.

5. The system of claim 4, wherein the respective one of the plurality of balanced detectors is configured to receive a respective one of the two out-of-phase optical signals and to generate the heterodyne electrical output signal of the respective one of the plurality of balanced detectors.

6. The system of claim 1, wherein the phase modulator comprises an electro-optical (EO) crystal modulator, wherein the phase modulator comprises a lithium niobate crystal modulator.

7. The system of claim 1, wherein the transceiver array further comprise a plurality of transmit (TX) optical elements, and wherein a TX optical element of the plurality of TX optical elements is coupled to a TX phase modulator of the plurality of phase modulators.

8. The system of claim 7, wherein the TX phase modulator is configured to receive a TX optical signal from a TX splitter, and wherein the TX splitter is coupled to a TX modem.

9. The system of claim 8, wherein the TX optical signal is pre-compensated, and wherein a sub-aperture of the transceiver array comprises a TX optical element and the RX optical element.

10. The system of claim 1, wherein a sub-aperture of the transceiver array comprises one of the RX optical element or a TX optical element, and wherein the TX optical element is surrounded by some of the plurality of RX optical elements.

11. A method of providing a phased-array coherent transceiver, the method comprising:
    providing a transceiver array comprising a plurality of receive (RX) optical elements;
    coupling the plurality of RX optical elements via a plurality of RX optical fibers to an optical receiver comprising a plurality of phase modulators;
    coupling the plurality of phase modulators to a plurality of balanced detectors;
    configuring a phase modulator of the plurality of phase modulators to correct a phase of an optical signal and produce a corrected phase by using a phase command signal generated based on a heterodyne electrical current signal including phase information related to the corrected phase and an atmospheric disturbance; and coupling a first portion of an output light signal of the phase modulator to a multi-input optical combiner, wherein the multi-input optical combiner is configured to coherently combine first portions of output light signals of the plurality of phase modulators.

12. The method of claim 11, further comprising configuring the multi-input optical combiner to coherently combine the first portion of the output light signal of the plurality of phase modulators for coupling to a modem.

13. The method of claim 12, wherein the optical receiver comprises a photonic integrated circuit including the plurality of phase modulators, and wherein the method comprises coupling the photonic integrated circuit to the plurality of balanced detectors.

14. The method of claim 13, further comprising coupling the photonic integrated circuit to the plurality of balanced detectors via a plurality of two-input combiners, and configuring a two-input combiner of the plurality of two-input combiners to receive a second portion of the output light signal of a respective phase modulator and a local oscillator (LO) signal and to generate two out-of-phase optical signals, wherein the two out-of-phase optical signals have 180 degrees phase difference.

15. The method of claim 13, further comprising configuring the phase modulator to process the phase of the optical signal by using the phase command signal generated by a control circuit.

16. The method of claim 15, further comprising configuring the respective one of the plurality of balanced detectors to receive a respective two out-of-phase optical signals and to generate the heterodyne electrical output signal of the respective one of the plurality of balanced detectors.

17. The method of claim 11, wherein the transceiver array further comprise a plurality of transmit (TX) optical elements, wherein a sub-aperture of the transceiver array comprises a TX optical element and the RX optical element, and wherein the method further comprises:

coupling a TX optical element of the plurality of TX optical elements to a TX phase modulator of the plurality of phase modulators, and configuring the TX phase modulator to receive a pre-compensated TX optical signal from a TX splitter, wherein the pre-compensated TX optical signal is preprocessed to counter an adverse effect of an atmospheric turbulence on the pre-compensated TX optical signal.

18. The method of claim 11, wherein a sub-aperture of the transceiver array comprises one of the RX optical element or a TX optical element, and wherein the TX optical element is surrounded by some of the plurality of RX optical elements.

19. A free-space optical (FSO) communication system comprising:

at least two FSO transceivers:

an FSO transceiver of the at least two FSO transceivers coupled via an FSO modem to a network, wherein the FSO transceiver comprises:

a transceiver array comprising a plurality of receive (RX) optical elements; and an optical receiver coupled to the plurality of RX optical elements via a plurality of RX optical fibers, wherein:

the optical receiver comprises a photonic integrated circuit including a plurality of phase modulators coupled to a plurality of balanced detectors, and a phase modulator of the plurality of phase modulators is configured to correct a phase of an, optical signal and produce a corrected phase by using a phase command signal generated based on a heterodyne electrical current signal including phase information related to the corrected phase and an atmospheric disturbance.

20. The FSO communication system of claim 19, wherein the phase modulator of the plurality of phase modulators is configured to process the phase of the optical signal to correct for disturbance of the phase due to atmospheric turbulences, the optical signal being received from an RX optical element of the plurality of RX optical elements.

* * * * *